May 29, 1956 W. H. BLOSER 2,747,354
BELOW GROUND ROW CROP HARVESTING UNIT
Filed Sept. 29, 1953 6 Sheets-Sheet 2
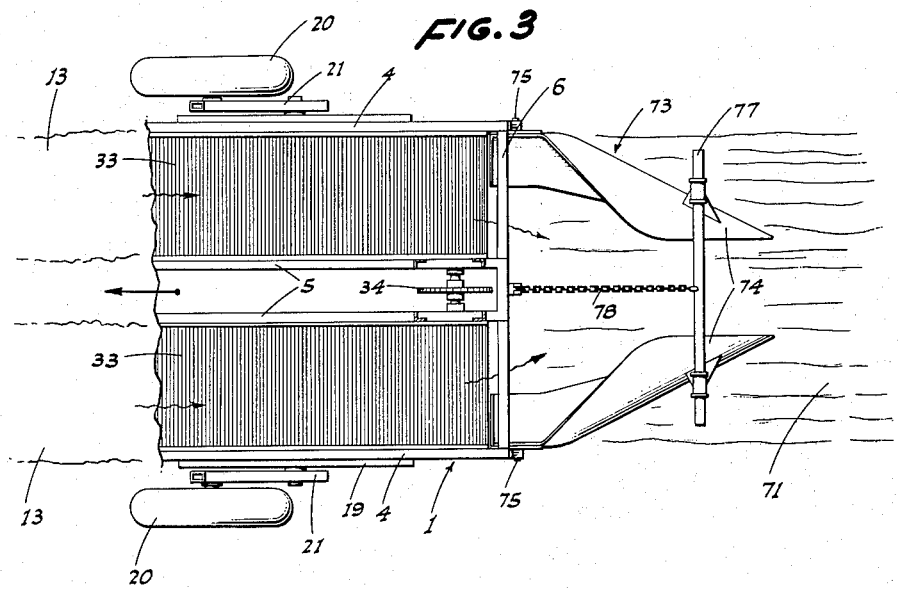
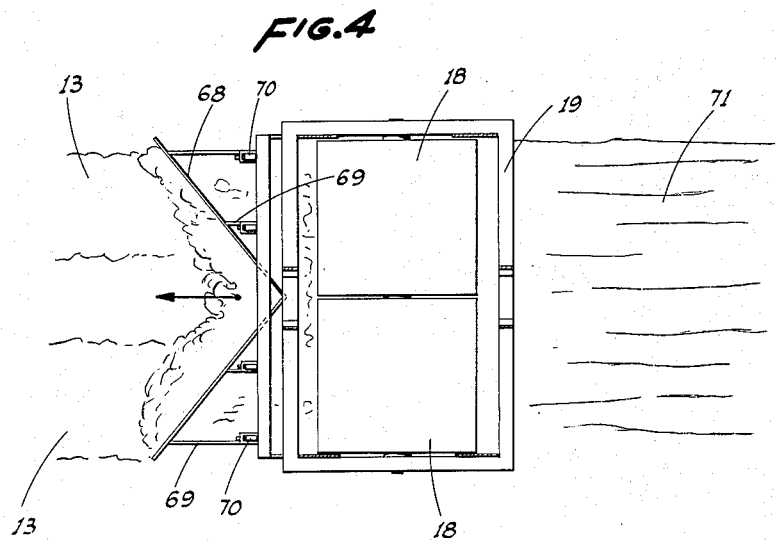
INVENTOR.
Wm. H. Bloser
BY
ATTYS

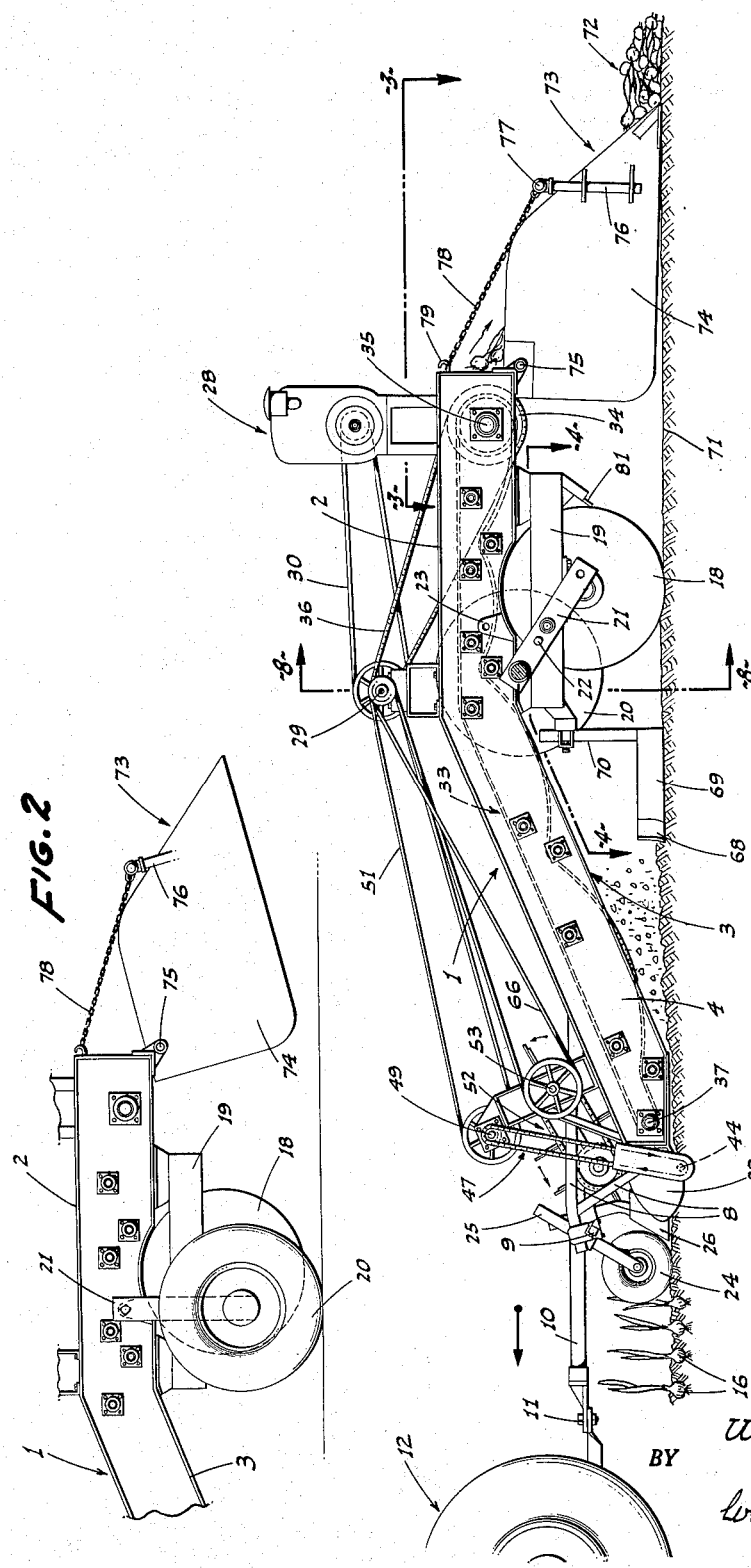

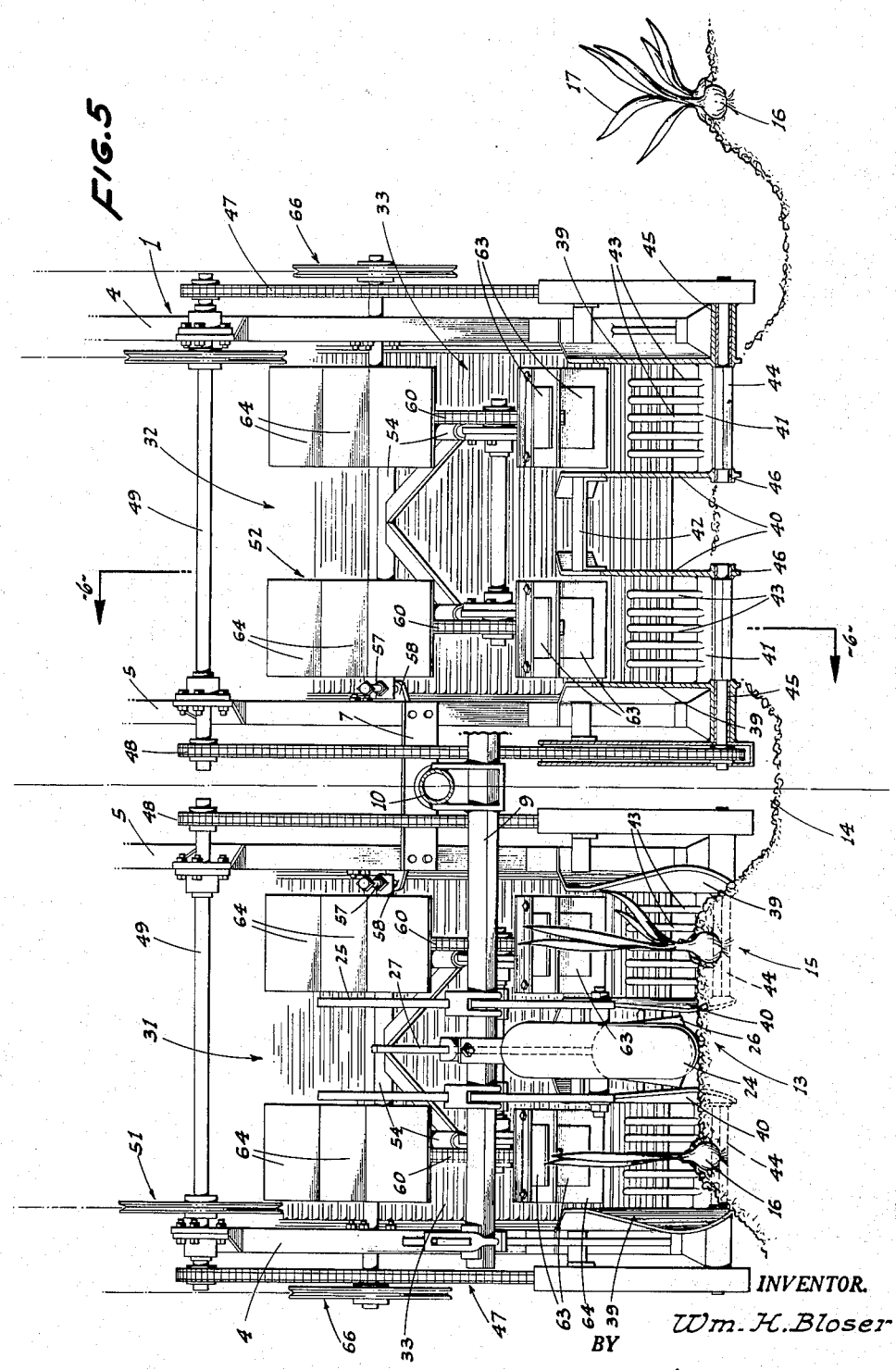

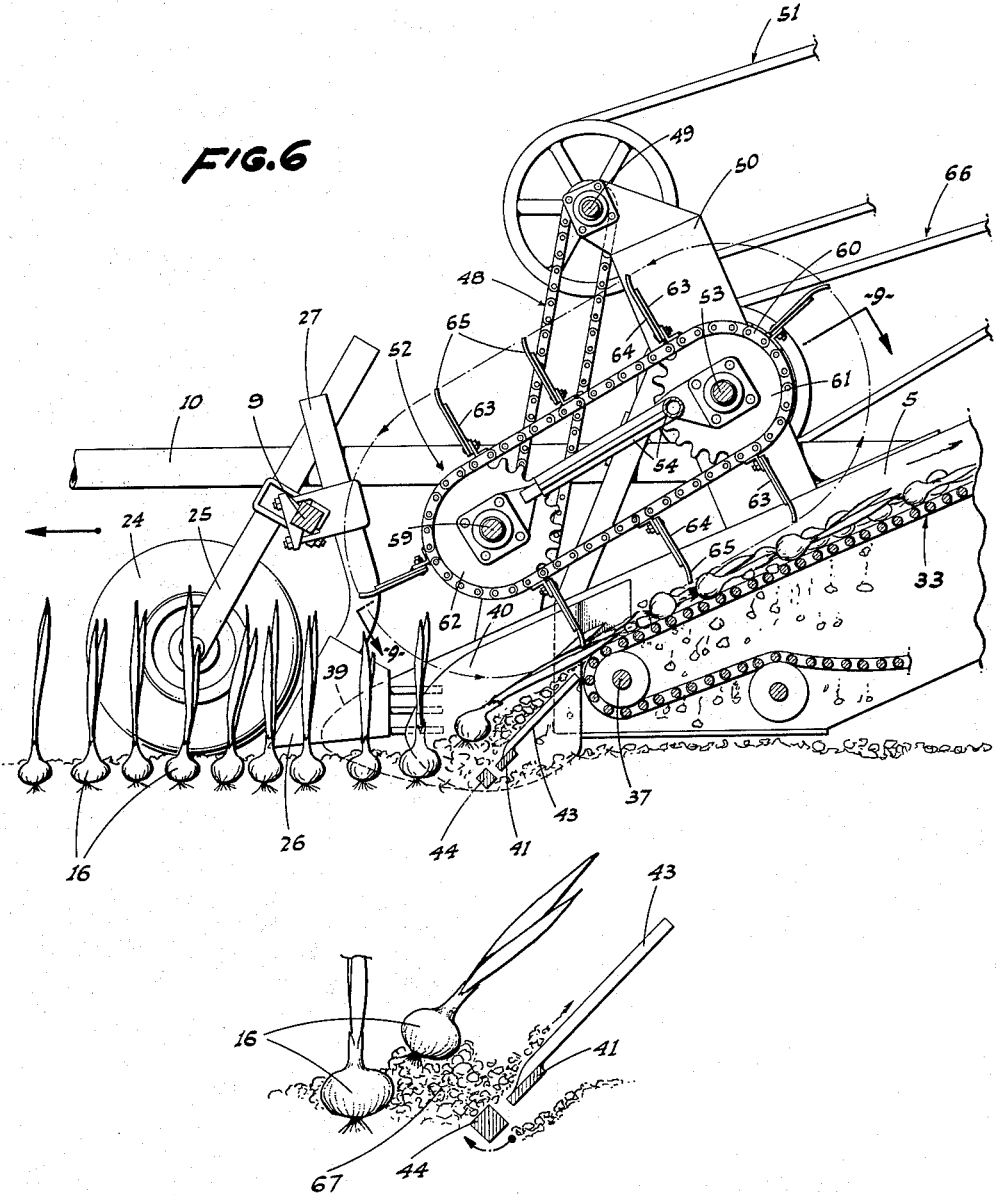

May 29, 1956 W. H. BLOSER 2,747,354
BELOW GROUND ROW CROP HARVESTING UNIT
Filed Sept. 29, 1953 6 Sheets-Sheet 5
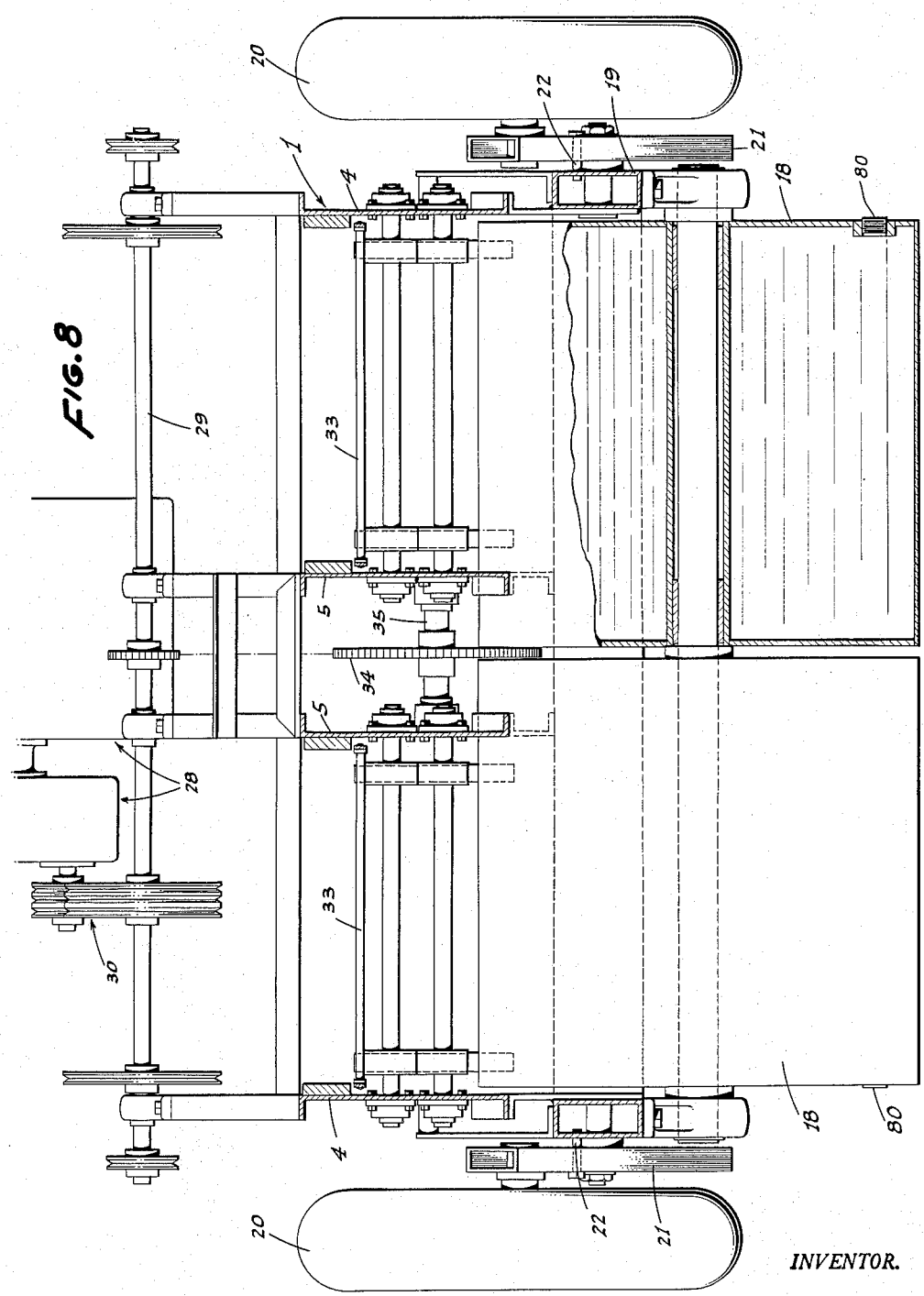
INVENTOR.
Wm. H. Bloser
BY
Webster & Webster
ATTYS

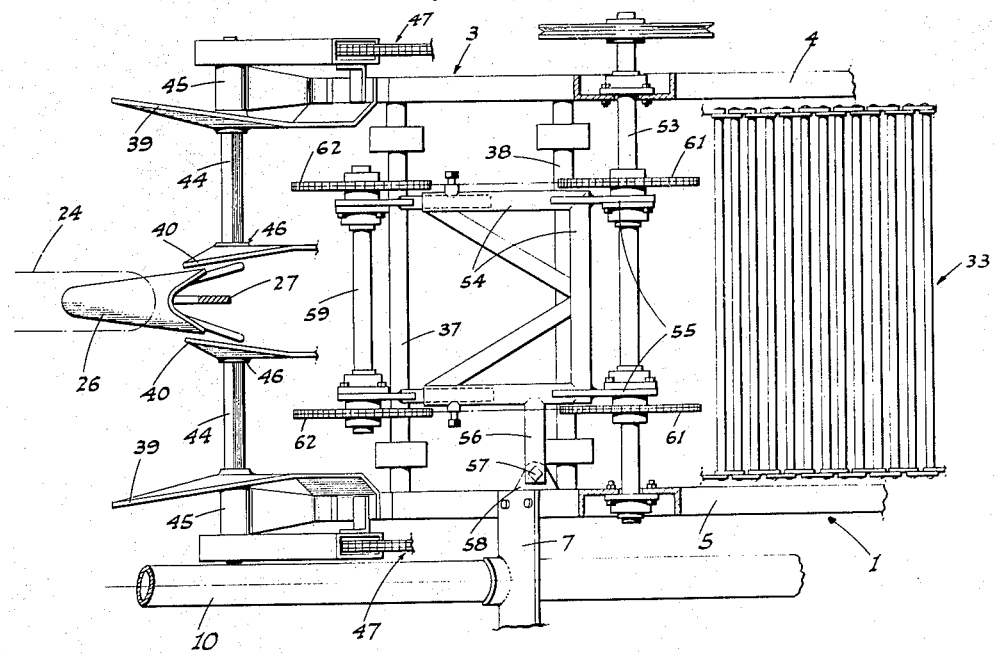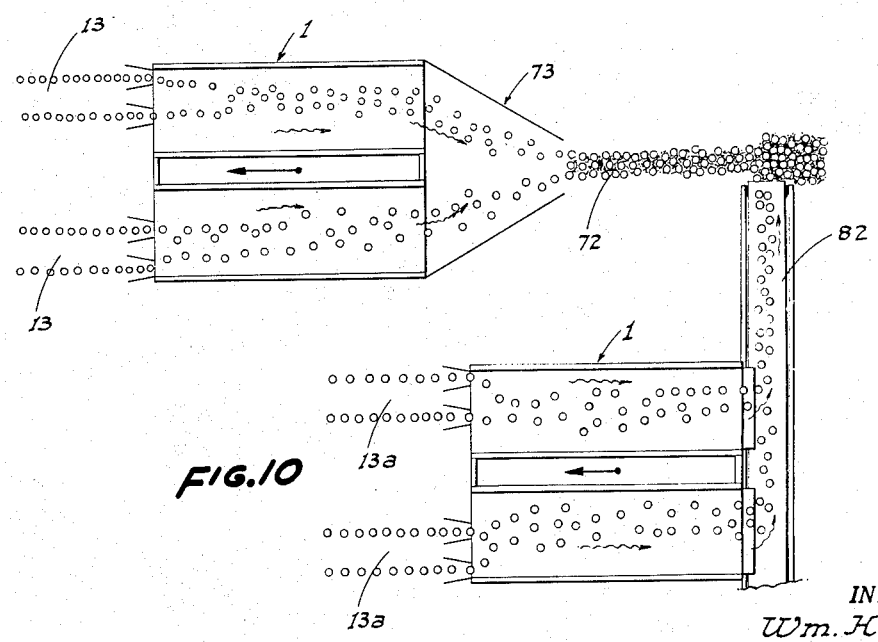

United States Patent Office 2,747,354
Patented May 29, 1956

2,747,354

BELOW GROUND ROW CROP HARVESTING UNIT

William H. Bloser, Salinas, Calif., assignor to Major Distributing Company, Salinas, Calif., a corporation of California Application September 29, 1953, Serial No. 382,961

1 Claim. (Cl. 55—51)

This invention is directed in particular to, and it is a major object to provide, an improved power actuated harvester for row crops; the implement—as here shown and described—being especially designed for use to harvest row grown onions, but is readily adaptable for other row crops of similar nature.

Another important object of the present invention is to provide a row crop harvester which is operative to dig and lift the crop from the ground, to then elevate and convey the crop rearwardly while separating loose earth therefrom, and to thence discharge the crop onto the ground rearwardly of the implement; the latter including means to level and roll the ground intermediate the digging point and the discharge point, whereby the crop is deposited on a smooth, compact ground surface from which such crop may be readily gathered, either manually by field workers, or by a mechanical pick-up device and loader.

An additional object of the invention is to provide a row crop harvester, as in the preceding paragraph, which embodies a novel crop digging and lifting mechanism which delivers onto a foraminous conveyor, and the latter including a portion which leads rearwardly a distance above-ground; there being a ground leveling blade running ahead of a roller, and both thereof being disposed below said portion of the foraminous conveyor and intermediate the digging point and discharge point.

A further object of the invention is to provide a row crop harvester, as above, which includes—at the rear end—a novel device to windrow the dug crop on the smooth compacted ground surface.

A still further object of this invention is to provide a row crop harvester which embodies a novel sweep conveyor disposed above and cooperating with the digging and lifting mechanism, as well as the adjacent portion of the foraminous conveyor, whereby to assure of positive feeding of the dug crop from said mechanism onto said foraminous conveyor.

It is also an object of this invention to provide a row crop harvester, particularly for onions, which is operative to dig the crop without cutting or bruising the same, yet with a positive action and a minimum of crop loss; i. e., undug crop left in the rows.

A separate object of the invention is to provide a row crop harvester which is designed for ready manufacture, convenience of operation, and long service with a minimum of maintenance and repair.

Still another object of the invention is to provide a practical, reliable, and durable row crop harvester, and one which will be exceedingly effective for the purpose for which it is designed.

These objects are accomplished by means of such structure and relative arrangement of parts as will fully appear by a perusal of the following specification and claim.

In the drawings:

Fig. 1 is a side elevation of the improved row crop harvester as in operation.

Fig. 2 is a fragmentary side elevation of the rear of the harvester showing particularly the wheels in lowered position and the crowder in raised position; this being the position of such parts for transport of the harvester when it is not in use.

Fig. 3 is a fragmentary plan view on line 3—3 of Fig. 1.

Fig. 4 is a fragmentary plan view on line 4—4 of Fig. 1.

Fig. 5 is an enlarged transverse vertical elevation showing, in front view, the two harvesting assemblies; the left hand assembly being in full elevation, while the right hand assembly is in sectional elevation.

Fig. 6 is a longitudinal vertical sectional view taken generally on line 6—6 of Fig. 5, but including the related depth-gauge wheel and the cooperating deflector shoe, together with the mounts therefor.

Fig. 7 is a fragmentary diagrammatic elevation showing the ground engaging portion of the digging and lifting mechanism, and particularly its action to provide a cushion of earth between the rotating digging shaft and the crop being dug.

Fig. 8 is an enlarged transverse section on line 8—8 of Fig. 1; one of the rollers being partly broken away and partly in section.

Fig. 9 is a fragmentary sectional plan view on line 9—9 of Fig. 6; the chains and paddles of the sweep conveyor being omitted.

Fig. 10 is a diagrammatic plan view showing the manner in which the harvester may be adapted to form a single windrow of the crops dug from a plurality of laterally disposed pairs of growing beds.

Referring now more particularly to the drawings, and to the characters of reference marked thereon, and at present to Figs. 1–9 inclusive, the improved row crop harvester comprises an elongated, heavy-duty main frame, indicated generally at 1; such main frame including a horizontal, above-ground rear portion 2, and a forwardly and downwardly inclined front portion 3, as shown. At its forward end the main frame 1 terminates closely adjacent the ground.

The main frame 1, which is of heavy-duty open construction, includes two pairs of longitudinally extending, transversely spaced side beams; the outer side beam of each pair being indicated at 4, and the inner side beam being indicated at 5. The two inner side beams 5 are spaced apart, as shown, and all of the side beams are secured as a unitary part of the main frame by suitable cross members; the rear cross member being indicated at 6 and an intermediate cross member being indicated at 7.

The main frame 1 includes, at the front, transversely spaced, forwardly projecting frame extensions 8, and a transverse tool bar 9 is secured to and spans between said frame extensions 8.

A centrally disposed draft tongue 10 is fixed in connection with the intermediate cross member 7 and the transverse tool bar 9, projecting ahead of the latter and being attached, as at 11, to a tractor 12; the latter being adapted to pull the implement in a field lengthwise of and over side by side crop beds 13 initially separated by an irrigation furrow 14. Each crop bed 13 has growing therein two transversely spaced crop rows 15; i. e., rows of onions 16 whose above-ground tops are indicated at 17.

The main frame 1 is supported below the horizontal rear portion 2 thereof by means of a pair of transversely spaced rollers 18 journaled in close end to end relation within a horizontal rectangular mounting frame 19 fixed in connection with said main frame 1. The rollers are disposed and dimensioned to ride, for the full width, atop the corresponding crop beds 13, and to also extend inwardly thereof a distance approximately half the width of the intermediate furrow 14. In other words, the rollers 18, being in closely adjacent end to end relation, provide for ground rolling engagement substantially continuously across and between adjacent crop beds 13.

While the rollers 18 support the implement at the rear when it is in use, said rollers are raised above-ground, for transport of the implement, by means of rubber-tired wheels 20 disposed to the sides of the main frame 1. The wheels 20 are carried on crank arms 21 pivoted in connection with the sides of the roller mounting frame 19, and such crank arms are adjustable between a position with the wheels raised above-ground, as in Fig. 1, to a ground engaging position, as in Fig. 2; the rollers 18 in such latter position of the wheels being raised above-ground.

The crank arms 21 are held in these selective positions by a removable holding pin 22 which, in the raised position of the wheels, pins the arms 21 to the frame 19, and in the lowered position of the wheels pins the arms 21 to ears 23 on the main frame 1.

When the implement is in use with the rollers 18 riding the beds 13, the forward end of the main frame 1 and the hereinafter described mechanisms mounted in connection therewith, are maintained at proper height by depth-gauge wheels 24 secured in connection with the transverse tool bar 9 by standards 25. The depth-gauge wheels 24, of which there are a pair, ride centrally along the top of adjacent crop beds 13.

A V-type deflector shoe 26 runs directly to the rear of each depth-gauge wheel 24, and is supported by a standard 27 attached to the transverse tool bar 9; each deflector shoe 26 including rearwardly projecting deflector fingers, as shown.

When the implement is adjusted for transport, with the wheels 20 lowered and the rollers 18 raised, the depth-gauge wheels 24 may be similarly lowered to provide full-length clearance of the implement above-ground.

The horizontal rear portion 2 of frame 1 supports an engine and transmission combination, indicated generally at 28, which drives a forwardly disposed, transverse countershaft 29 by means of an endless belt and pulley unit 30.

The driven mechanisms of the implement are actuated from the transverse countershaft 29 in the manner as will hereinafter appear.

Within the confines of the main frame 1 the implement includes a left hand harvesting assembly and a right hand harvesting assembly, indicated generally at 31 and 32, respectively, and mounted in the main in connection with the corresponding pair of side beams 4 and 5. The harvesting assemblies 31 and 32 are disposed to work along the corresponding ones of adjacent crop beds 13, and as said harvesting assemblies are identical—except for being right and left hand—a description of one will suffice for both.

Each of the harvesting assemblies 31 and 32 comprises the following:

An endless, foraminous conveyor 33 extends from end to end of the main frame 1 intermediate the side beams 4 and 5; such endless conveyor being of the type which includes a multiplicity of transverse rods disposed in adjacent but parallel relation, with said rods flexibly linked together at the ends, as shown. At the rear end of the main frame 1 the endless, foraminous conveyor 33 is supported by, and driven from, drive sprockets 34 on a cross shaft 35; the latter being actuated from the countershaft 29 by an endless chain and sprocket unit 36.

The endless, foraminous conveyor 33 is carried, at the forward end of the main frame and immediately adjacent the ground, by a roller shaft 37, while intermediate its ends—in both the upper and lower runs—said conveyor is supported by other rollers shafts 38.

A crop digging and lifting mechanism is mounted in connection with the main frame 1 directly ahead of the lower or forward end of the endless, foraminous conveyor 33; said mechanism comprising the following:

Two pairs of upstanding side shields are disposed in laterally spaced apart relation directly ahead of the forward end of the endless, foraminous conveyor 33; each such pair including an outer side shield 39 and an inner side shield 40 disposed in transversely spaced apart relation and in position such that the onion rows 15 are disposed centrally between the shields 39 and 40 of the corresponding pair thereof. The shields 39 and 40 of each pair are of sufficient depth so that upon advance of the implement, said shields run into or below the level of the corresponding crop bed 13 (see Fig. 5).

The two outer side shields 39 are fixed in connection with the adjacent side beams 4 and 5 of the main frame 1, and the side shields 39 and 40 of each pair are secured together at the bottom by a fixed cross bar 41. Additionally, the two inner side shields 40 are fixed together, adjacent the top, by a cross bar 42, thus forming a rigid unitary structure supported by the main frame 1.

The fixed cross bars 41 are each fitted with a plurality of spaced, upwardly and rearwardly inclined lifter fingers or bars 43 which extend upward to a termination closely adjacent the forward end of the endless, foraminous conveyor 33 and in position to deliver onto the rearwardly traveling upper run of the latter.

A horizontal, transversely extending, rotary digging shaft 44, which is square in cross section, is disposed slightly ahead of and below each fixed cross bar 41; such rotary digging shaft 44 being journaled in connection with the related outer side shield 39, as at 45, and with the related inner side shield 40, as at 46.

The rotary digging shafts 44 are driven to turn in the direction indicated in Fig. 7, each by means of an endless chain and sprocket unit; said units being indicated at 47 and 48, respectively. The endless chain and sprocket units 47 and 48 extend upwardly to a transverse countershaft 49 journaled on the upper ends of posts 50 which upstand from the side beams 4 and 5. The countershaft 49 derives its rotation from the countershaft 29 through the medium of an endless belt and pulley unit 51. The lower end portions of the endless chain and sprocket units 47 and 48 run in shields, as shown, to prevent clogging with earth.

A longitudinally extending but relatively short endless, sweep conveyor 52 is mounted above and in position to work in cooperation with the lifter fingers 43 and the forward end of the endless, foraminous conveyor 33; said sweep conveyor 52 (see particularly Figs. 6 and 9) being constructed as follows:

A rear cross shaft 53 is journaled in connection with and spans between the posts 50 and a relatively small rectangular floating frame 54 is pivoted, as at 55, to the rear cross shaft 53, and thence extends therefrom at a forward and downward incline and in vertically swingable relation. Downward swinging of the floating frame 54 is limited by a laterally projecting stop arm 56 having an adjustment screw 57 which engages downwardly against a stop 58 on the adjacent side beam 5.

The floating frame 54, which is adjustable in length, as shown, includes a front cross shaft 59, and transversely spaced pairs of endless chains 60 are trained about and span between alined upper and lower sprockets 61 and 62 fixed on the cross shafts 53 and 59, respectively.

A plurality of rubber-faced paddles 63 are secured to and extend transversely between the chains 60; such paddles being circumferentially spaced and projecting outwardly at substantially right angles to said chains. The rubber faces, indicated at 64, are secured to the paddles 63 on the front thereof and project some distance outwardly of the corresponding edges of said paddles, whereby to provide flexible tips 65.

The endless, sweep conveyor 52 is driven, so that its lower run travels rearwardly, by means of an endless belt and pulley unit 66 connected between the countershaft 29 and the rear cross shaft 53.

In operation of the implement the harvesting assemblies 31 and 32 each work along the corresponding crop bed 13, with the rows 15 of onions 16 entering between the side shields 39 and 40 of the two pairs thereof; the V-shaped deflector shoe 26 behind each depth-gauge wheel 24 cutting and sweeping all intermediate growth laterally for subsequently passage between the pairs of side shields 39 and 40.

The gauge wheels 24 are set so that the rotary digging shafts 44 and the fixed cross bars 41 run some distance below the surface of the corresponding crop bed 13. As the implement advances, the digging shafts 45 agitate the earth in the upper portion of the crop bed 13 and form a cushion 67 of earth, which rides over the digging shafts 44 and onto the cross bars 41 and lifter fingers 43; such cushion of earth carrying with it the onions 16, whereby the latter are effectively and positively dug, fed to the fingers 43, and lifted by the latter. By reason of the constantly existing cushion 67 of earth the onions 16 are dug and lifted without being directly contacted by the digging shafts 44, which assures that the onions are not bruised or cut.

The lifter fingers 43 deliver the onions 16 upwardly and rearwardly onto the upper run of the endless, foraminous conveyor 33.

It will thus be seen that the lifter fingers form a grate providing a crop transfer bridge between the zone of the below-ground rotary shaft 44 and the crop elevating conveyor 33, enabling the forward end of the latter to be disposed above ground level and so free from the abrasive action of the dirt.

As the onions 16 travel upwardly on the lifter fingers 43 the tops 17 thereof are engaged by the rubber-faced paddles 63 of the endless, sweep conveyor 52, imparting a pulling action on said tops, which further assures of positive delivery of the onions 16 onto said upper run of the endless, foraminous conveyor 33. As the rubber faces 64 project beyond the paddles 63 as flexible tips 65, the onions 16—if directly engaged—are not cut but are merely swept rearwardly, as desired.

After the onions 16 are deposited on the upper run of the endless, foraminous conveyor 33 they travel thereon for the full length of such conveyor; all loose dirt which accompanied the onions into said conveyor falling through the openings therein and being redeposited on the bed 13, all in the main a short distance rearwardly of the described digging and lifting mechanism.

A horizontally disposed, forwardly facing, V-shaped leveling blade 68 of a width equal to that of the assembly of rollers 18 is disposed immediately ahead of the latter; such leveling blade including a plurality of rearwardly extending thrust bars 69 fixed in connection with standards 70 clamped to the front of the roller mounting frame 19.

The V-shaped leveling blade 69 is adjusted so that, as the implement advances, it shaves the top of the adjacent crop beds 13 and deposits sufficient earth in the intermediate furrow 14 to fill the latter. Thereafter, the rollers 18—working atop the beds 13 and the filled furrow 14—form a smooth compacted ground surface, indicated at 71, onto which the onions 16 discharge from the rear end of each endless foraminous conveyor 33; the onions 16—by reason of their discharge onto the rolled compacted ground surface 71—being thereafter easily gathered manually by field workers, or by a mechanical pick-up device and loader.

In order to aid in such pick-up of the onions as discharged onto the rolled compacted ground surface 71 the two endless, foraminous conveyors 33 are formed in an endless windrow 72 on said surface 71 by a crowder, indicated generally at 73, and which comprises a pair of rearwardly convergent crowder wings 74 pivoted at their forward upper corners, as at 75, to the rear of the main frame 1. Adjacent their rear end portions the rearwardly convergent crowder wings 74 are fitted with posts 76 connected by a cross shaft 77. A suspension chain 78 connects between a central point on the cross shaft 77 and a hook 79 on the main frame at the rear.

When the implement is in use the suspension chain 78 is adjusted so that the crowder 73 is in lowerd position, as in Fig. 1, but for transport—when the implement is out of use and when the wheels 20 are lowered—the chain 78 is adjusted so that the crowder 73 is raised, as in Fig. 2. As the onions discharge from the rear end of the two foraminous endless conveyors 33 they are engaged by the crowder 73 and swept into the single windrow 72 which extends lengthwise of the surface 71 centrally between two crop beds 13.

In order to enhance the weight of the rollers 18 to obtain more solid compaction of the surface 71, said rollers are water filled, and for this purpose each of the rollers is fitted with a filler plug 80. Additionally, the rollers 18 are maintained clean by scrapers 81 cooperating therewith.

Under certain harvesting conditions it may be desirable to not only form into a single windrow the onions harvested from a pair of adjacent crop beds 13, but to also carry into said windrow the onions harvested from the next pair of crop beds. When this is done the arrangement is as shown in Fig. 10; one pair of crop beds being indicated at 13, at before, while the immediately adjacent pair of crop beds is indicated at 13A.

In harvesting a field the implement is first worked along alternate pairs of the crop beds 13; i. e., skipping every other pair of said crop beds. As the implement is worked along such alternate pairs of said crop beds 13 a single windrow 72 is formed as before on the rolled compacted surface 71. Thereafter the implement is worked along the pairs of crop beds 13a which were originally skipped; the onions from the endless, foraminous conveyors 33 now being discharged from said conveyors not into the crowder 73, but rather onto a laterally extending, driven endless conveyor 82 mounted on the rear of the main frame 1 in substitution for said crowder.

The conveyor 82 projects in a direction, and is of sufficient length, to discharge into the windrow 72 previously formed along a pair of the crop beds 13 worked on the first pass through the field. The result is that the onions harvested from each of the pairs of crop beds 13a are added to the windrow 72, reducing by half the number of windrows to be picked up from the rolled compacted ground surfaces 71 after the harvesting operation is completed.

With the described row crop harvester a crop, such as onions, can be harvested in a rapid and expeditious manner, with the onions windrowed for ready and convenient pick-up, and with a minimum of loose earth intermingled therewith; all effecting an economy in the harvesting operation.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In combination with a transverse below-ground row-crop digging element and a dug-crop elevating conveyor having its forward end a predetermined distance rearwardly of and above the digging element, a dug-crop lifting and bridging unit comprising a plurality of transversely spaced fingers sloping upwardly to the rear and mounted in a fixed position relative to the digging element and conveyor and extending from adjacent and rearwardly of the digging element to adjacent and ahead of the conveyor; the upper surface of the fingers being substantially flush with the upper edge of the digging element and with the upper face of the forward end of the conveyor.

References Cited in the file of this patent

UNITED STATES PATENTS

| | | |
|---|---|---|
| 1,869,641 | Wilson | Aug. 2, 1932 |
| 2,314,773 | Dahlman | Mar. 23, 1943 |
| 2,406,976 | Walz et al. | Sept. 3, 1946 |
| 2,432,956 | Walz et al. | Dec. 16, 1947 |
| 2,452,418 | Zuckerman | Oct. 26, 1948 |
| 2,463,019 | Clausen | Mar. 1, 1949 |
| 2,515,966 | Polisena | July 18, 1950 |
| 2,544,023 | Johnson | Mar. 6, 1951 |
| 2,579,013 | Sampson | Dec. 18, 1951 |
| 2,632,290 | Anderson | Mar. 24, 1953 |